United States Patent Office 2,758,976
Patented Aug. 14, 1956

2,758,976

NONFLAMMABLE HYDRAULIC FLUID

George E. Barker, Llangollen Estates, Del., assignor to Atlas Powder Company, Wilmington, Del., a corporation of Delaware No Drawing. Application March 9, 1953,
Serial No. 341,353

2 Claims. (Cl. 252—79)

This invention relates to fluid compositions for transfer of energy in hydraulic devices such as hydraulic brakes, clutches, shock absorbers, servo mechanisms, door checks, lifting jacks and the like.

The required properties of superior hydraulic fluids are well known. They should be non-corrosive, non-foaming, lubricating liquids, fluid at all temperatures likely to be encountered in use, without deteriorating effects on rubber and plastic sealing materials. In many applications it is desirable, if not absolutely necessary, that the fluids be substantially nonflammable, especially in hydraulically operated mechanisms in airplanes. A further property much sought after in hydraulic fluids is a low temperature coefficient of viscosity. Smooth operation of hydraulic devices at widely varying temperatures is facilitated if the variation of the fluid's viscosity with changing temperature is minimized.

An object of the present invention is to provide hydraulic fluid compositions which are virtually nonflammable, which are fluids over a wide temperature range, which are lubricating to metal parts, which are non-corrosive and without deteriorating effect on sealing members, and which have exceptionally favorable viscosity-temperature relationships.

A further object is to provide a novel ether-ester which is uniquely adapted to convert aqueous glycol solutions into superior hydraulic fluids.

The above and other objects will become more apparent in the course of the following description of the invention.

Hydraulic fluids in accordance with the invention comprise aqueous compositions of ethylene glycol and a novel ether-ester of a dicarboxylic acid to be described and characterized more fully hereinbelow. The compositions may contain minor proportions of auxiliary solvents, corrosion inhibiting agents, and the like, but the essential components are the said ether-ester, water and ethylene glycol.

The novel ether-ester of the invention is the condensation product of a dimerized, 18 carbon, polyunsaturated fatty acid, with 28 molecular proportions of ethylene oxide. The dimerized fatty acids employed in the condensation are well known and methods for preparing them or their methyl esters are described, for example, by Bradley and Johnson (Ind. Eng. Chem. 33, 86 (1941)) and in U. S. Patent 2,491,350 to Young and Sparks. Particularly preferred is the dimer of linoleic acid which may be prepared from the methyl ester of linoleic acid or from the methyl esters of natural oil acids containing significant fractions of linoleic acid or acids which isomerize to linoleic under the conditions of polymerization.

The ether-ester of the invention is formed by direct reaction between the said dimerized acid and ethylene oxide in the molar proportions of 1 to 28. Suitable conditions for carrying out the reaction are well known. Preferably the acid is introduced into an autoclave, together with a small amount of alkaline material to serve as a catalyst. Under good agitation the acid is heated to 80°–140° C. and ethylene oxide is introduced into the autoclave gradually or in small increments. As each increment of ethylene oxide reacts (indicated by falling pressure) additional ethylene oxide is introduced until a total of 28 molar proportions have been added. The pressure is preferably not allowed to go above 150 pounds per square inch, the control being maintained by regulating the rate of addition of ethylene oxide and by cooling the reaction mixture if its temperature begins to rise as a result of the exothermic reaction.

Details of the preparation thus described are presented in the following example, wherein the dimeric acid employed is one known in the trade as "Emery's Dimer Acids." This is made by the Emery Industries, Inc. and is described as a commercial form of dimeric polymer consisting essentially of dilinoleic acid. Further information concerning the preparation of this product may be found in the Journal of the American Oil Chemists Society, 24, p. 65 (1947).

EXAMPLE 1

An autoclave of about 2 gallons capacity, equipped with a stirrer, heat-exchanger coils, and means for recording temperature and pressure was charged with 1310 grams of "Emery's Dimer Acid" and 8 grams of sodium methylate. The free space above the charge was flushed three times with nitrogen at 10 pounds gauge pressure at room temperature. The autoclave was closed, the charge heated to 140° C. and the residual pressure vented. Ethylene oxide was then introduced in increments while maintaining the temperature and pressure at 140° C. and in the range of 30 to 50 pounds per square inch gauge, respectively. When 2740 grams of ethylene oxide had been introduced, the autoclave was closed and reaction conditions maintained until the ethylene oxide was all consumed as indicated by a decrease of pressure to substantially atmospheric. The total time for introducing the ethylene oxide and completing the reaction was 16 hours. The product was discharged from the autoclave, deodorized by subjecting it to a temperature of 120° C. under a pressure of 10 millimeters of mercury, bleached by treatment with 0.5% of 30% hydrogen peroxide and 0.5% water for 0.5 hour at 120° C., cooled to 100° C. and filtered. The resulting product was a viscous straw colored liquid with an acid number of less than 1.0 and a saponification number of about 57.

In the hydraulic fluids of the invention ether-esters of the type described and exemplified above are compounded with ethylene glycol and water. In general, the water content should not exceed 50% of the total composition and it is preferred that the ratio of water to ethylene glycol be no greater than 50/50. Compositions containing as little as 20% water are useful in hydraulic fluids but it is preferred to keep the ratio of water to ethylene glycol at a value greater than 30/70. To insure nonflammability the hydraulic fluid composition should contain at least 35% water.

The addition of any amount, upwards from 1% of 28-oxyethylene linoleic acid dimer to a glycol-water mixture within the above defined limits confers improved properties thereon with respect to its use as a hydraulic fluid. Particularly, when at least 10% of the composition comprises the said ether-ester, the viscosity-temperature relationship becomes very favorable. Continuing additions of 28-oxyethylene linoleic acid dimer, up to a concentration of from 18% to 20%, flatten the viscosity-temperature curve still more. Higher concentrations may be employed, up to 30%, although the added advantage is slight.

The compositions of the invention may be prepared by combining the ingredients in any desired order. Since the 28-oxyethylene linoleic dimer is not miscible with dry ethylene glycol in the proportions required by the compositions, it is convenient to add the water of the hydraulic fluid to either the glycol or the ether-ester and mix the formed aqueous solution with the remaining component. The formation of a two-phase system is thus avoided. Freshly made compositions appear to undergo a slight viscosity increase on ageing so that the compositions should be prepared and stored a few days before putting them in service.

In Table I below, the effect of the addition of successively greater amounts of 28-oxyethylene linoleic acid dimer to an aqueous glycol solution is shown. The glycol solution contained 48 parts by weight of ethylene glycol to 40 parts by weight of water. To this mixture varying quantities of the said ether-ester were added and the viscosities of the resulting solutions were measured at 130° F. and −40° F., respectively. The table shows the found viscosities together with the slopes of the lines formed by plotting the viscosities against the temperatures on Chart E of the ASTM Standard Viscosity-Temperature Charts for Liquid Petroleum Products (D341).

*Table I*

| | Composition | | Viscosities | | |
|---|---|---|---|---|---|
| Ex. | Aq. glycol solution, Percent | 28-OE linoleic acid dimer, Percent | Centistokes at 130° F. | Centistokes at −40° F. | Slope of visc.-temp. curve |
| 2 | 91 | 9 | 8.5 | 223.9 | .522 |
| 3 | 90 | 10 | 11.1 | 251.8 | .472 |
| 4 | 89 | 11 | 18.6 | 293.7 | .380 |
| 5 | 88 | 12 | 23.7 | 316.7 | .345 |
| 6 | 86 | 14 | 42.3 | 411.2 | .275 |
| 7 | 84 | 16 | 65.5 | 543.7 | .241 |
| 8 | 82 | 18 | 99.5 | 679.2 | .204 |
| 9 | 80 | 20 | 166.5 | 1,434.1 | .208 |

The freezing points of all of the compositions of Table I fell between −65° and −70° F. The base glycol-water solution freezes at approximately −43° F. and the slope of the viscosity-temperature curve is about 1.1. A remarkable flattening of the viscosity-temperature curve is effected by the incorporation of from 10% to 20% of the novel ether-ester of the invention and at the same time the freezing point is depressed by nearly 25° F. This last improvement is of particular value in the compounding of fluids for use in airplane mechanisms which frequently must be operative under very low temperatures.

In the illustrative examples of Table I the ratio of ethylene glycol to water was maintained constant in order to better demonstrate the effectiveness of the novel ether-ester of the invention. Compositions containing other proportions of glycol to water and minor proportions of other solvents are equally within the purview of the invention. Such compositions are illustrated in the following examples.

EXAMPLE 10

Composition:
  Ethylene glycol _____percent__ 48
  Ethylene glycol monomethyl ether _____do____ 3
  Water _____do____ 35
  28-oxyethylene linoleic acid dimer_____do____ 14
Viscosities:
  At 130° F. _____centistokes__ 14.9
  At −40° F. _____do____ 423
Viscosity-temperature slope _____ .466

EXAMPLE 11

Composition:
  Ethylene glycol _____percent__ 47
  Hexylene glycol _____do____ 4
  Water _____do____ 35
  28-oxyethylene linoleic acid dimer _____do____ 14
Viscosities:
  At 130° F. _____centistokes__ 8.7
  At −40° F. _____do____ 530
Viscosity-temperature slope _____ .610

EXAMPLE 12

Composition:
  Ethylene glycol _____percent__ 51
  Water _____do____ 39
  28-oxyethylene linoleic acid dimer ____do____ 10
Viscosities:
  At 130° F. _____centistokes__ 10.4
  At −40° F. _____do____ 260.2
Viscosity-temperature slope _____ .489

What is claimed is:

1. A hydraulic fluid composition exhibiting a viscosity-temperature slope of not more than 0.49 on Chart E of the American Society for Testing Materials Specification D341 and consisting essentially of a solution of from 10% to 30% by weight of the condensation product of 28 molar proportions of ethylene oxide with one molar proportion of a dimerized, 18-carbon, polyunsaturated fatty acid in an aqueous ethylene glycol containing from 50% to 70% by weight of ethylene glycol and correspondingly from 50% ot 30% by weight of water.

2. A nonflammable hydraulic fluid composition consisting essentially of a composition as defined in claim 1 wherein the water content of the composition is at least 35% by weight.

References Cited in the file of this patent

UNITED STATES PATENTS

| 2,400,393 | De Groote | May 14, 1946 |
| 2,473,798 | Kienle et al. | June 21, 1949 |
| 2,588,970 | Esposito | Mar. 11, 1952 |